UNITED STATES PATENT OFFICE.

HEINRICH UMBER, OF BERLIN, GERMANY, ASSIGNOR TO JOHANN ABRAHAM VON WÜLFING, OF BERLIN, GERMANY.

EFFERVESCENT CITRIC-ACID-HEXAMETHYLENE-TETRAMIN TABLET.

1,065,988.      Specification of Letters Patent.      Patented July 1, 1913.

No Drawing.      Application filed July 20, 1912. Serial No. 710,685.

*To all whom it may concern:*

Be it known that I, HEINRICH UMBER, doctor of chemistry, a citizen of the Empire of Germany, residing at Berlin, in the Empire of Germany, have invented a new and useful Effervescent Citric-Acid-Hexamethylene-Tetramin Tablet, of which the following is a specification.

My invention consists in a method of producing durable effervescent tablets from citric acid and hexamethylene-tetramin, which may either be simply mixed together or chemically combined, the said tablets being useful both as a bladder disinfectant and as a diuretic.

I will now proceed to describe my invention.

The citric acid and the hexamethylene-tetramin, which may be either simply mixed or chemically combined, are mixed with a mixture of alkali carbonate and anhydrous sodium acetate and the resulting mass is formed into tablets in any known manner. The tablets are preserved in tubes closed with metallic capsules or corked, and remain permanently undecomposed in rooms of ordinary degree of moisture. They are very easily soluble in water, while carbonic acid separates, and the water shows an agreeable and sourish refreshing taste. The alkali carbonate may be sodium bicarbonate or water free soda. The acetate of sodium presents the important advantage, that it supports the disinfecting effect of the hexamethylene-tetramin, since it is itself a diuretic. But its chief advantage consists in preventing the gradual liberation of the carbonic acid from its combination with the alkali as hereinafter explained.

In case the citric acid and the hexamethylene-tetramin are to be employed in a chemically combined state, that is in crystals, this salt should be produced by adding one molecule of citric acid and a surplus of alcohol to a concentrated aqueous solution of one molecule of hexamethylene-tetramin, and allowing the first precipitated mass to stand for a long time over ice, until it hardens into a mass of crystalline needles. This is a white salt, which is easily soluble in warm water, also in methyl-alcohol, and in warm ethyl-alcohol, and melts at 105 to 106° centigrade. The crystallized citric-acid hexamethylene-tetramin may also be produced without the surplus of alcohol in the manner, that the citric acid alone is added to the concentrated aqueous solution of hexamethylene-tetramin and the solution is inoculated by contact with a small quantity of crystals obtained in previous operations, whereby any quantity in the crystalline form instead of in the syrupy state can be obtained.

When the mixture of citric acid and hexamethylene-tetramin or the above mentioned crystallized citric-acid-hexamethylene-tetramin is mixed with sodium bicarbonate or sodium-carbonate alone, carbonic acid will be liberated on keeping, so that the tablets formed from this mixture would not be durable. The same result would follow, if the said components were mixed with soda salt free from water alone; it is therefore essential to add the anhydrous acetate of sodium for the reason given above.

Following are a few examples of the manufacture:

Example 1: 2 kilograms of finely powdered hexamethylene-tetramin are mixed with 3 kilograms of finely powdered citric acid, to the perfectly dry mixture are then added 1.5 kilograms of soda free from water and 2.4 kilograms of anhydrous acetate of sodium, after which the mass is formed into tablets.

Example 2: 3 kilograms of citric acid are dissolved in 5.4 liters of alcohol of 96% and this solution is mixed with an aqueous solution of 2 kilograms of hexamethylene-tetramin in 2.9 liters of water. Then the solution obtained is inoculated with a small quantity of the crystallized compound obtained by a previous operation. After standing over ice for one day the mass of crystals separated amounts to about 95% of the theoretical quantity. The separated mass of crystals is then dried and is mixed with a mixture of 1.36 kilograms of anhydrous sodium carbonate and 2.17 kilograms of anhydrous sodium acetate. From the resulting mixture tablets are formed.

Example 3: 2 kilograms of hexamethylene-tetramin are dissolved in 2.9 liters of water, and to the solution formed 3 kilograms of powdered citric acid are added, whereupon firstly the entire citric acid is dissolved. Then the liquid is inoculated with a small quantity of the crystallized compound obtained by a previous reaction. After a certain time the crystallization commences with a rise of temperature which crystallization is aided by cooling. The crystals formed are separated by filtration and the separated mass is dried, next it is mixed with a mixture of 1.36 kilograms of anhydrous sodium carbonate and 2.17 kilograms of anhydrous sodium acetate, and the resulting mixture is formed into tablets.

I claim:

The herein described effervescent medicinal tablet consisting of citric acid, hexamethylene-tetramin, an alkali carbonate and anhydrous sodium acetate.

In testimony whereof I affix my signature in presence of two witnesses.

HEINRICH UMBER.

Witnesses:
 FRITZ QUADE,
 EBERHARD THIELEMANN.